Patented Apr. 22, 1924.

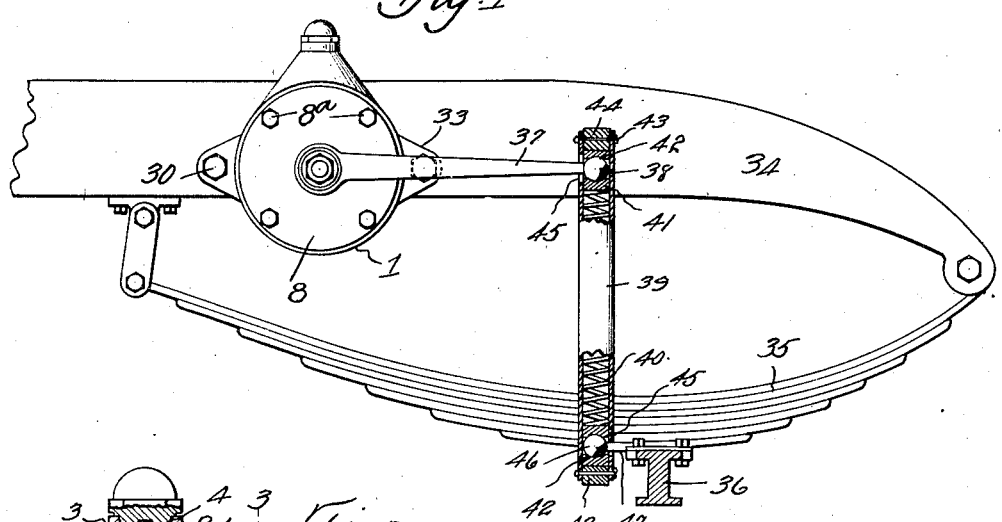
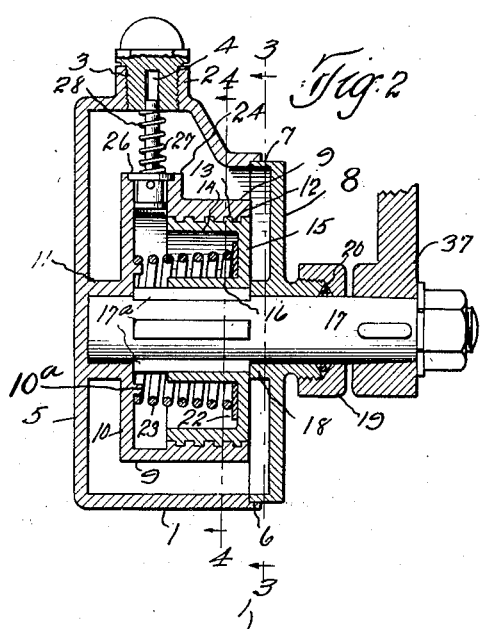
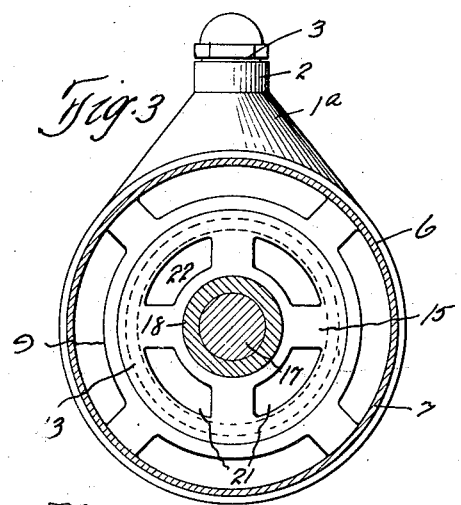
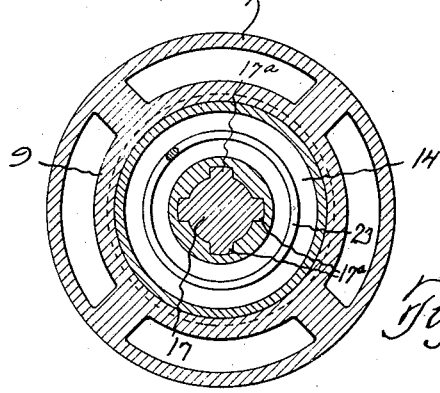
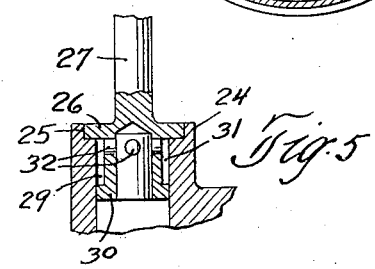

1,491,209

UNITED STATES PATENT OFFICE.

MAX J. SIELAFF, OF CLEVELAND, OHIO.

MOVEMENT-CHECKING DEVICE.

Application filed December 1, 1920. Serial No. 427,512.

*To all whom it may concern:*

Be it known that I, MAX J. SIELAFF, a citizen of the United States, residing at Cleveland, in the county of Cuyahoga and State of Ohio, have invented a certain new and useful Improvement in Movement-Checking Devices, of which the following is a full, clear, and exact description, reference being had to the accompanying drawings.

This invention relates to devices for checking the movements of relatively movable bodies, such as the bodies and axles of vehicles, doors and their casings, etc. The general object of the invention is so to construct a device of the fluid or hydraulic type which may be produced at minimum cost; which will reduce to a minimum the liability of leakage; and which will enable all of the working parts to be effectively lubricated. Further and more limited objects of the invention will appear hereinafter and will be realized in and through the construction and arrangement of parts shown in the accompanying drawings and set forth in the claims hereto annexed.

Referring to the drawings, Fig. 1 represents a sectional side elevation of one of the side frames and the spring and axle of an automobile, showing in elevation my invention applied thereto; Fig. 2 is a central sectional view taken through the shock absorbing or checking device shown in the preceding view, the bolts which secure the cover to the casing being omitted and the shaft being shown in elevation; Figs. 3 and 4 are sectional views corresponding respectively to the lines 3—3 and 4—4 of Fig. 2; and Fig. 5 is a sectional detail through the cylinder relief valve.

The device illustrated herein, whether used as a shock absorber for vehicles or as a check for doors and other movable objects, comprises generally a casing for the reception and retention of oil or similar liquid, a cylinder, a plunger or piston located within the said casing, valves controlling the circulation of such oil or other liquid between said casing and cylinder, means for attaching the said casing to one of the relatively movable objects, and means connected with the other relatively movable object and with the piston or plunger for operating the latter against the resistance created by the liquid in said cylinder and the valve controlling its passage into said casing.

The casing comprises a wall 1 which is generally cylindrical in shape, being provided with an extension 1ª having a neck 2 provided with a plug 3, threaded into said neck, said plug having a bore 4 providing a guide for the stem of a valve to be described hereinafter. In addition to the wall 1, the casing comprises a bottom wall 5 which may be formed integral with the wall 1. The end of the wall 1 which is opposite the wall 5 is provided with an annular seat 6 which is adapted to receive the flange 7 on a cover 8, the said cover being secured in place by bolts 8ª securing the same to the wall 5.

The parts 1, 5 and 8 provide a closed casing within which there is located the cylinder and piston or plunger. The cylinder comprises a cylindrical wall 9 spaced from the wall 1, a bottom or rear wall 10 spaced from the wall 5 and preferably connected thereto by a sleeve 11, the said sleeve and the parts 5, 9 and 10 being shown as formed from an integral casting. The wall 9 is provided with a coarse internal thread 12 with which there meshes a thread 13 on the peripheral flange 14 of a piston head 15, the said head being provided with a hub 16 which is splined onto a shaft 17, the spline projections being indicated at 17ª. This shaft is mounted within the neck or sleeve 11 and in a bearing sleeve 18 carried by the cover 8, the outer end of this sleeve being threaded and provided with an apertured cap 19 forming a packing gland, the packing material being indicated at 20.

The head 15 of the piston is provided with a plurality of segmental ports 21 which are adapted to be covered by an annular valve 22, said valve being mounted upon the hub 16 and normally held in its seat by means of a helical spring 23 bearing at one end against the said valve and at its opposite end against the bottom closure 10 and surrounding a centering annular rib 10ª on such closure.

The cylinder is provided with an outlet neck 24 having in its outer end an annular seat 25 for the peripheral portion of the relief valve 26. This valve is provided with a stem 27 which is adapted to be received within the guide bore 4, and the valve is normally held to its annular seat by means of a helical spring 28 surrounding said stem and bearing against the said valve and the plug 3. The valve is guided during its movements by the stem and by a flange 30 on a short sleeve 29, said flange engaging the inner wall of the neck 24. An annular space 31 is provided between the neck 29 and the surrounding portion of the neck 24, the space communicating with the cylinder and the interior of said neck through ports 32 in the latter and providing a means for lubricating the relatively sliding surfaces as well as preventing an unpleasant whistling sound ordinarily produced by the friction of the fluid escaping past said valve.

The wall 5 is shown as provided with lugs 33 by means of which the device thus far described may be attached to any one of two relatively movable bodies, such as the side frame 34 of an automobile, in order to reduce the vibrations of the springs 35 interposed between such side frames and the axle 36.

As a means for connecting the shaft 17 with the frame or the axle I have provided said shaft with an arm 37 splined thereto, the said arm being shown as provided with a ball 38 at its outer end. 39 denotes a link consisting of a casing having therein a spring 40, the opposite ends of the spring pressing against blocks 41 each having a concaved seat therein. Opposite to the blocks 41 are the blocks 42 each having a concaved seat and conveniently secured in the casing 39 as by means of plugs 43 and cotter pins 44. The casing 39 is slotted on the opposite sides thereof and near each end, as indicated at 45, the said slots receiving, respectively, the ball 38 on the end of the arm 37 and a ball 46 on the end of an arm 47 which is clamped to the axle, as well as said arms. The casing 39 and the parts therein provide a sort of lost motion drag-link connection between the axle and the side frame, the spring and the slots compensating for small vibrations without transmitting the same from one arm to the other.

With the parts constructed and arranged as described, the casing 1, 5 and 8 and the cylinder therein will be filled, preferably with oil, through the neck 2, and the plug 3 will be screwed home, first having inserted the valve 26 in place. Assuming that the thread upon the piston and within the cylinder is a right-hand thread, a movement of the axle toward the frame will tend to unscrew the piston. The casing and the cylinder being filled with oil, the valve 22 will be opened by this movement, maintaining the cylinder filled. A movement in the opposite direction will move the piston 15 toward the bottom 10 of the casing, thus compressing the oil within the cylinder. When this pressure reaches a predetermined point (determined by the weight of the vehicle body and the tension of the spring 27) the valve 26 will be opened, the rebound between the frame and the axle being checked by the compression of the oil.

In practice, the pitch of the threads 13 is such that a rotation of 90° of the shaft 17 and of the cylinder within the piston will cause a movement of the latter of about ½ inch. Locating the threads on the outside of the piston will enable me to give such a pitch to the threads as will enable this movement to be secured.

It will be noted that any tendency of the oil to leak around the threads is resisted by the pressure between the working surfaces of the threads upon the piston and within the cylinder; furthermore, this leakage is reduced by the shape of the threads, which are square.

Having thus described my invention what I claim is:

1. The combination, with a pair of relatively movable members, of a checking device operatively interposed therebetween, said device comprising a casing connected to one of said members, a cylinder in said casing and having an opening adapted to place the said cylinder and casing in communication, a shaft mounted within said casing, a piston slidably connected to said shaft, means connecting said shaft with the other of said members, pressure-controlled means normally closing the said opening and adapted to be opened by a movement of the said piston in one direction, the said piston having an opening for admitting fluid therethrough into the cylinder, a valve controlling the last mentioned opening and arranged to be opened by a movement of the piston in the reverse direction, and means, operative by such connecting means, for reciprocating said piston with respect to said shaft and cylinder.

2. A device of the character described comprising a casing, a cylinder in said casing having an opening adapted to place the said cylinder and casing in communication, a shaft rotatably mounted within said casing, a piston slidably connected to said shaft and having a thread meshing with a thread on said cylinder, pressure-controlled means normally closing the said opening and adapted to be opened through a movement of the said piston in one direction, the said piston having an opening for admitting fluid therethrough into the cylinder, and a valve controlling the last mentioned opening and arranged to be opened by a movement of the piston in the reverse direction.

3. A device of the character described comprising a casing having an opening, a cylinder within said casing having an opening in alignment with the first-mentioned opening, a piston within said cylinder and means for reciprocating the same, a valve cooperating with the second opening, said valve having a stem, a plug adapted to close the first opening and having a guideway for said stem, a spring surrounding said stem and engaging the said plug and tending to hold the valve in a position to close the second opening, and means for admitting fluid from said casing to said cylinder by and through the movement of the piston away from the second opening.

4. A device of the character described comprising a casing having a neck, a cylinder within said casing and having a neck provided with a valve seat, a valve cooperating with said seat and having a stem, a plug for closing the bore of the first neck and having a guideway for said stem, a spring surrounding the said stem and engaging the valve and the said plug, a piston within said cylinder, means for moving the said piston toward and from the valve-controlled outlet provided in the neck thereof, and means for supplying the said cylinder with liquid from the said casing upon the movement of the piston in the reverse direction.

5. A device of the character described comprising a casing, a cylinder within said casing and having an outlet adapted to discharge into said casing, a valve controlling said outlet and adapted to open when the pressure in said cylinder has reached a predetermined degree, the said cylinder having its inner wall threaded, a shaft rotatably mounted within said casing, a piston slidably connected with said shaft and having an external thread cooperating with the cylinder thread, the said cylinder having therein an opening, and a valve controlling said opening and arranged to uncover the same through the movement of the piston away from the first-mentioned valve.

6. A device of the character described comprising a casing, a cylinder within said casing and having an outlet opening adapted to communicate therewith, a valve controlling said opening and adapted and arranged to open when a predetermined degree of pressure has been created within said cylinder, a shaft mounted within said casing and extending through said cylinder and beyond the said casing, a piston reciprocably mounted on said shaft and within said cylinder, the said piston having in the head thereof one or more openings, a valve within said head and adapted to cover the opening or openings thereof, a spring pressing said valve toward said opening or openings, and means cooperating with said shaft for moving the said piston toward and from the outlet opening of said cylinder.

7. A device of the character described comprising a casing having in the top thereof an opening, a cylinder within said casing and having an opening presented toward the first-mentioned opening, a valve adapted to close the second opening and having a stem extending toward the first opening, a plug for the first opening having a guideway for said stem, a spring surrounding said stem and engaging said plug and forcing said valve toward its seat with respect to the second opening, a piston for said cylinder, means for moving the said piston toward and from the first mentioned opening, and means controlled by the movement of said piston for admitting fluid from the casing to the cylinder in and through the movement of the piston away from the second opening.

8. A device of the character described comprising a casing, a cylinder within said casing and having an outlet adapted to discharge into said casing and connected to and supported from said casing by a sleeve, a valve controlling said outlet and adapted to open when the pressure in said cylinder has reached a predetermined degree, a shaft mounted within said sleeve and extending outside said cylinder, a piston slidably connected with said shaft, and means operative by the movement of said piston away from said outlet for supplying fluid to the interior of the cylinder.

In testimony whereof, I hereunto affix my signature.

MAX J. SIELAFF.